Feb. 26, 1963 D. L. OLSON Re. 25,338

PRESSURE-OPERATED VALVE WITH MAGNETICALLY ACTUATED PILOT

Original Filed Dec. 20, 1955

INVENTOR.
Delwyn L. Olson
BY Emery, Varney
Whittemore & Dix.
ATTORNEYS

United States Patent Office

Re. 25,338
Reissued Feb. 26, 1963

25,338

PRESSURE-OPERATED VALVE WITH MAGNETICALLY ACTUATED PILOT

Delwyn L. Olson, Lake Mohawk, N.J., assignor to Marotta Valve Corporation, Boonton, N.J., a corporation of New Jersey Original No. 2,968,464, dated Jan. 17, 1961, Ser. No. 554,186, Dec. 20, 1955. Application for reissue Mar. 16, 1962, Ser. No. 180,948
8 Claims. (Cl. 251—30)

Matter enclosed in heavy brackets [ ] appears in the original patent but forms no part of this reissue specification; matter printed in italics indicates the additions made by reissue.

This invention relates to valves and more particularly to pressure-operated valves controlled by a pilot valve.

It is an object of the invention to provide an improved pilot-controlled valve, and more especially a magnetically-operated pilot valve. One feature of the invention relates to a compact construction in which the pilot valve is located within the body of a main valve element which is opened and closed by pressure of the fluid in the line commanded by the main valve. Another feature relates to a construction in which a magnetic operating mechanism for the pilot valve also operates the main valve element when the fluid pressure in the line is too low to operate the main valve element.

Other objects, features and advantages of the invention will appear or be pointed out as the description proceeds.

In the drawing, forming a part hereof, in which like reference characters indicate corresponding parts in all the views.

Figure 1:
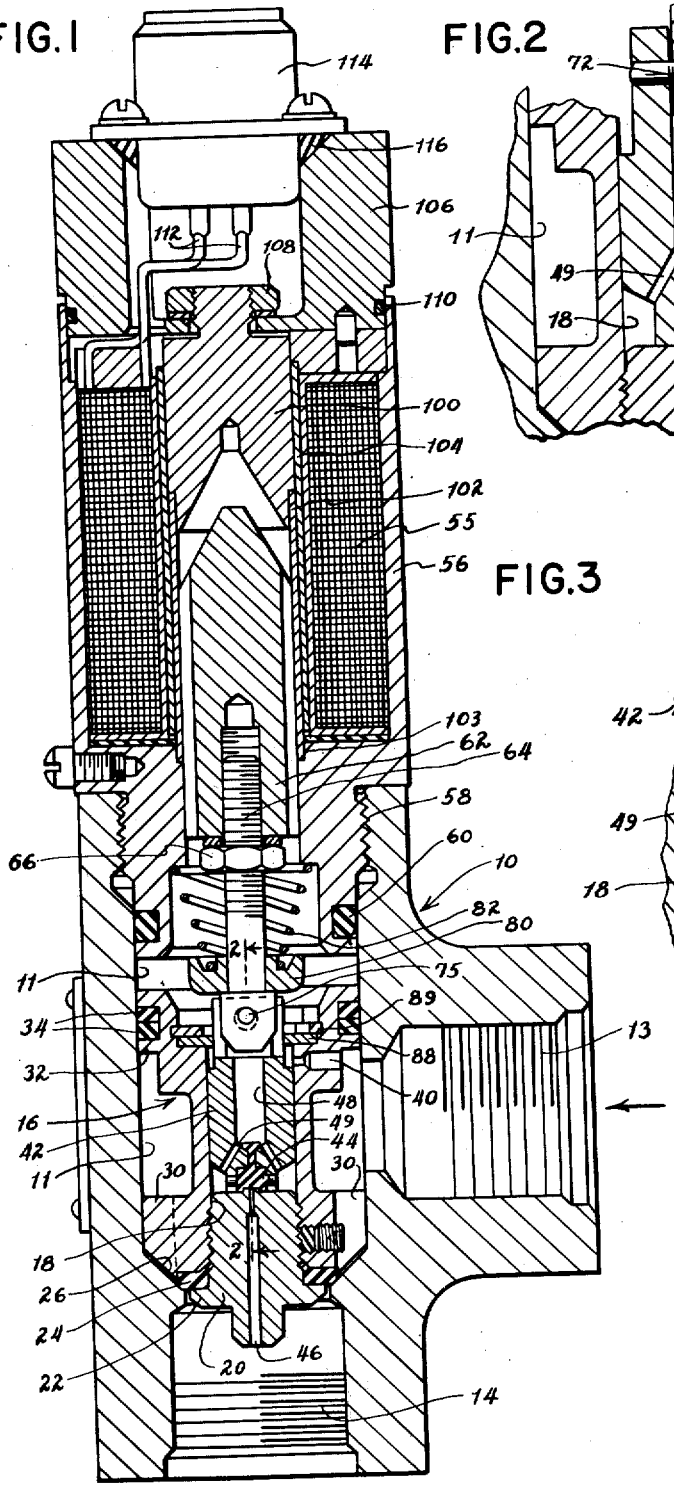
FIGURE 1 is a sectional view through a magnetically-operated, pilot-controlled valve made in accordance with this invention.
Figure 2:
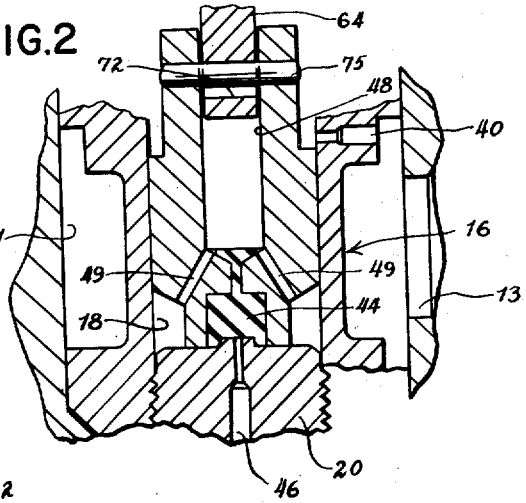
FIGURE 2 is an enlarged sectional view taken on the line 2—2 of FIGURE 1.
Figure 3:
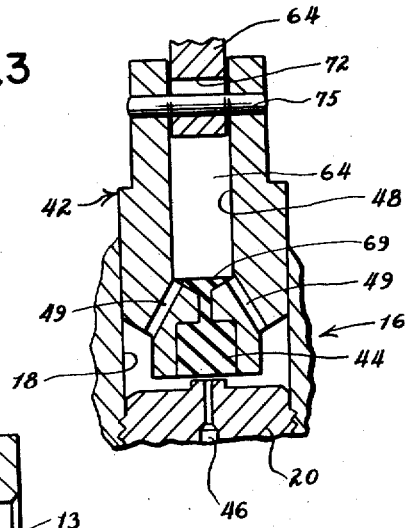
FIGURE 3 is a fragmentary view showing a portion of the structure of FIGURE 2 with the pilot valve in open position.

The valve includes a housing 10 enclosing a chamber 11. The chamber has an inlet 13 and an outlet 14.

A main valve element 16 is located within the chamber 11. There is a bore 18 extending axially through the main valve element 16 and in the forward end of this bore 18 there is a bushing 20. In the construction shown, the bushing 20 threads into the end of the bore 18 and has a flange 22 which clamps a plastic valve seat 24 against a surface of the main valve element 16. This seat 24 preferably has a tapered surface which contacts with a tapered face of a shoulder 26 located at the upstream end of the chamber outlet 14.

The main valve element 16 slides back and forth in the chamber 11 between open and closed positions and there are fins 30 at angularly spaced regions around the axis of the valve element 16 for holding the front end of the valve element centered in the chamber 11. The back end of the valve element 16 is cylindrical and fits the chamber 11 as a piston. This piston portion of the main valve element is indicated by the reference character 32 and it is located beyond the chamber inlet 13.

The piston portion 32 has piston rings 34 and the valve element 16 is held in closed position by fluid pressure in the chamber 11 behind the main valve element 16.

Fluid is admitted into the back end of the chamber 11, behind the piston portion 32 of the valve element, through a port 40. This port opens through the side of the valve element 16 and into the bore 18. High-pressure fluid from the inlet passage 13 flows through the port 40 and through the back end of the bore 18 into the space in the chamber 11 behind the piston portion 32 of the main valve element. The static pressure in chamber 11 is thus equal to inlet pressure on both sides of piston portion 32 of the main valve element. This pressure acts on the effective seat area created by poppet seat 24 to create a force which urges the valve element 16 into the closed position and seals inlet pressure at seat 24.

A pilot valve 42 is located in the bore 18 and this pilot valve preferably fits the bore as a piston and is movable therein toward and from the back face of the bushing 20. The pilot valve 42 has a plastic sealing element 44 on its front face, preferably a rubber insert in the front face, in position to cover a bleed outlet 46 which extends axially through the bushing 20. In the construction illustrated, the rubber insert is undercut to secure it more firmly in place. If the valve is designed for pressures in excess of 1,000 pounds per square inch, the sealing element 44 is preferably made of nylon or some other plastic which is stiffer than rubber.

When the pilot valve 42 is in closed position, that is, when the sealing element 44 is in contact with the back of the bushing 20, the port 40 is uncovered. When the pilot valve 42 moves away from the bushing 20, into open position, it covers the port 40, thus operating as a slide valve for closing or opening the port 40.

The pilot valve 42 has a passage opening through it from back to front. This passage includes a hollow portion 48, extending for most of the length of the pilot valve 42, and one or more small passage sections 49 which open through the front of the pilot valve 42 at locations offset from the area of the sealing element 44 which covers the bleed outlet 46.

The pilot valve 42 is moved into open position by magnetic operating mechanism which includes a solenoid having a coil 55 enclosed within a cover 56. This cover is connected to the housing 10 by threads 58 and there is a sealing ring 60 located in a recess of the cover 56 in position to contact with the face of the chamber 11 at the upper end of the chamber. A plunger 62 extends into the space within the coil 55, and this plunger 62 is connected to a rod 64 by a threaded connection within the plunger. A lock nut 66, threaded on the rod 64, holds the rod 64 in any position to which it is adjusted by threading it farther into or out of the plunger 62.

The forward end of the rod 64 extends loosely into a slot at the back of pilot valve 42 and is attached to the pilot valve 42 by means of a pin 75. This pin 75 extends through openings in the back portion of the pilot valve 42 and fits with a press fit in these openings. There is an opening 72 through the rod 64 and the pin 75 extends through this opening 72 but is substantially smaller than the opening so as to provide a lost motion connection between the rod 64 and the pilot valve 42.

There is a collar 80 on the rod 64 and this collar serves as a retainer for a spring 82 compressed between the collar 80 and a shoulder in the cover 56. The pressure of this spring urges the rod 64 forwardly, taking up the lost motion at the pin 75 and thrusting the pin and pilot valve forwardly to hold the pilot valve in closed position.

When the coil 55 is energized, the plunger 62 is moved rearwardly, and moves independently of the pilot valve 42 until the lost motion between the rod 64 and pin 75 is taken up. Further movement of the rod 64 pulls the pilot valve 42 into open position. The advantage of this lost motion is that the plunger 62 and its connected parts acquire some momentum so that the force applied to the pilot valve is a dynamic force for opening the pilot valve with a rapid movement.

Opening of the pilot valve 42 permits pressure behind the piston portion 32 of the main valve element to escape through the passage 48, the passage sections 49 and the bleed outlet 46. With this pressure behind the main valve element relieved, the fluid pressure from the inlet 13 presses against the front of the piston portion 32 and moves the main valve element 16 into open position. Thus, the main valve element 16 is moved in both directions by fluid pressure from the inlet 13 in response to the movement of the pilot valve 42 which selectively opens and closes the port 40 at the same time that it closes and opens, respectively, the bleed outlet 46.

The spring 82 also applies some force for moving the main valve element 16 into closed position; this force being exerted through the pilot valve 42 which contacts with the bushing 20 of the main valve element when the pilot valve is closed.

There is an abutment washer 88 located at the back end of the bore 18 and held in place by a snap ring 89. This abutment washer is in the path of a portion of the pilot valve 42 so that if the main valve element 16 is not moved by fluid pressure after the port 40 has been covered and bleed outlet 46 uncovered by the pilot valve 42, then continued movement of the pilot valve 42 brings the pilot valve into contact with the abutment washer 88 and applies the force of the solenoid to the main valve element 16 through the pull of the pilot valve 42. Thus the magnetic operating mechanism serves to open the main valve element when the fluid pressure is insufficient to move the main valve element into open position.

The solenoid has a fixed iron core 100 brazed to one end of a non-magnetic sleeve 102. The other end of this sleeve 102 is secured to the cover 56 by brazing 103. A brass sleeve 104 surrounds the connecting sleeve 102 and part of the fixed core 100.

In order to obtain maximum pull from the solenoid, the rod 64 is screwed into or out of the plunger 62 until the plunger contacts with the confronting face of the fixed core 100 while the rearward end of the main valve element 16 is just a short distance from the end of the chamber 11. In the illustrated construction, the portion of the cover 56 that screws into the housing 10 forms the end of the valve chamber 11.

An adapter 106 is attached to the upper end of the fixed core 100 by a nut 108 threaded over an extension of the fixed core 100. A sealing ring 110 prevents leakage of gas, moisture and dust into the interior of the cover 56. Current is supplied to the winding 55 through conductors 112 which lead to a receptacle 114 at the upper end of the adapter 106. A sealing ring 116 prevents leakage between the base of the receptacle 114 and the adapter 106.

The preferred embodiment of the invention has been illustrated and described, but changes and modifications can be made and some features can be used in different combinations without departing from the invention as defined in the claims.

What is claimed is:

1. A pilot-controlled valve including a housing enclosing a chamber having inlet and outlet passages, a main valve element in the chamber, an annular shoulder in the chamber and with which the element contacts when in closed position, the valve element having a body with an axial bore therein and a bleed outlet of smaller cross section than the bore at the front end of the valve element and through which the bore communicates with the outlet passage, the back of the valve element being cylindrical and fitting within a cylindrical portion of the chamber as a piston, a pilot valve that slides back and forth in the bore and into a forward position where it closes the bleed outlet through the front of the valve, the pilot valve having a rearward face exposed to the pressure in said cylindrical portion of the chamber behind the piston and being held in its forward closed position by said pressure whereby increase in pressure on the back of the valve element holds the pilot valve in closed position with greater force, and in which the main valve element has a bushing in the forward end of the bore and a flange extending radially beyond the bore with a back face confronting a surface of the valve element, a plastic seat clamped between the flange and said surface of the valve element, the plastic seat extending radially beyond the flange and into position to contact with the annular shoulder when the valve element is in closed position, the inlet passage opening into the chamber at a location between the seat end of the main valve element and the piston portion at the back of the main valve element, the pilot valve fitting the bore in the main valve element as a piston and being movable into and out of contact with the back of the bushing, the means for moving the pilot valve into open position including magnetic operating mechanism having a movable element connected with the pilot valve by a lost-motion connection, means urging the pilot valve toward closed position including a spring exerting pressure against the pilot valve through the lost-motion connection, an abutment on the main valve element behind a portion of the pilot valve and in the path thereof whereby movement of the pilot valve into open position beyond a predetermined limit causes the pilot valve to displace the abutment and move the main valve element toward open position.

2. A pilot-controlled valve including a housing enclosing a chamber having inlet and outlet passages, a main valve element in the chamber, an annular shoulder in the chamber and with which the element contacts when in closed position, the valve element having a body with an axial bore therein and a bleed outlet of smaller cross section than the bore at the front end of the valve element and through which the bore communicates with the outlet passage, the back of the valve element being cylindrical and fitting within a cylindrical portion of the chamber as a piston, a pilot valve that slides back and forth and into a forward position where it closes the bleed outlet through the front of the valve element, motor means for moving the pilot valve rearwardly, said motor means including a reciprocating element and a lost-motion connection between the reciprocating element and the pilot valve, a spring that urges the pilot valve toward closed position and that also urges the main valve element toward closed position by pressure of the pilot valve against the main valve element, the spring being operably connected with the reciprocating element on the same side of the lost motion connection as are the motor means so as to take up the lost motion in the direction of the pilot valve and the main valve element when said valve and valve element are in closed positions.

3. The pilot-controlled valve described in claim 2 and in which there is an abutment on the main valve element behind the pilot valve and with which the pilot valve contacts after moving for a limited distance to pull the main valve element into open position, the movement of the pilot valve through said limited distance being substantially greater than the lost motion in the connection between the pilot valve and the reciprocating element of the motor means.

4. The pilot-controlled valve described in claim 2 and in which there is a counter-bore at the rearward end of the axial bore, a washer against the end face of the counter-bore with the opening through the washer of smaller diameter than the pilot valve so as to provide an abutment with which the pilot valve comes in contact as it moves rearwardly away from the bleed outlet, and a snap ring behind the washer and engaging a groove in the counter-bore for holding the washer in place, the length of the axial bore from the forward end to the washer exceeding the length of the pilot valve by a distance substantially greater than the length of the lost motion in the connection between the pilot valve and the reciprocating element of the motor means.

5. A pilot-controlled valve including a one-piece valve housing enclosing a cylindrical chamber having an outlet passage at one end, an annular shoulder in the chamber around the upstream end of the outlet passage, an inlet opening through a side wall of the cylindrical chamber intermediate the ends of the chamber, a main valve element located in the chamber and having forward and rearward portions of one-piece construction located in the chamber forward and rearward, respectively, of the inlet opening and fitting the chamber with a running fit for movement therein toward and from the annular shoulder, the valve element having a body with an axial bore therein from the rearward end and a bleed outlet of smaller cross section than the bore at the front end of the valve element and through which the bore communicates with the outlet passage, the rearward portion of the valve element operating within the cylindrical chamber as a piston, a pilot valve that slides back and forth in the bore between forward and rearward positions, and in the forward position of which it closes the bleed outlet through the front of the valve element, the pilot valve having a rearward face exposed to the pressure from behind the rearward portion of the valve element, [and being held in its forward closed position by said pressure, whereby increase in pressure on the back of the valve element holds the pilot valve in closed position with greater force,] the valve element having a port opening through one side thereof and into the chamber at a location between the forward and rearward portions of the valve element whereby one end of said port opening is subject to the direct pressure from said inlet opening, the port communicating with the bore at a location which is uncovered by the pilot valve when the pilot valve is in its forward position and which is covered by the pilot valve when said pilot valve is in its rearward position, and operator-controlled means for moving the pilot valve into its rearward position in the bore to cover said port and stop the flow of gas at inlet pressure into the bore and the chamber space rearward of the valve element, said pilot valve in said rearward position leaving the bleed outlet in the front of the valve element open for the escape of fluid from the bore to the outlet of the valve chamber.

6. The pilot-controlled valve described in claim 5, and in which the assembly includes an electro-magnetic motor having a housing secured to the valve housing and closing the rearward end of the cylindrical chamber, the motor housing having a cylindrical portion that fits into the rearward portion of said chamber with a smooth face of the motor housing confronting a smooth face of the chamber rearward of the valve element to center the motor housing, threaded connecting means beyond said cylindrical portion of the motor housing connecting the housing together, the motor having a reciprocating element operating in a clearance that constitutes a continuation of the chamber behind the main valve element, sealing means between the motor housing and the valve housing and out of contact with moving parts of the valve assembly, and motion transmitting connection between the motor and the pilot valve for moving the pilot valve rearwardly in the bore to the location where the pilot valve covers said port and leaves the bleed outlet in the front of the valve element open for the escape of fluid from the bore to the outlet of the valve chamber.

7. In the pilot-controlled valve described in claim 6, the improvement of a plunger of the electro-magnetic motor operating with running clearance in a guide which is closed at its rearward end, and slots in the sides of the plunger extending lengthwise of the plunger for the escape of air from the closed space behind the plunger.

8. The pilot-controlled valve described in claim 6 and in which said other sealing means are between the smooth face of the motor housing and the confronting smooth face of the chamber rearward of the valve element.

References Cited in the file of this patent or the original patent

UNITED STATES PATENTS

| | | |
|---|---|---|
| 534,514 | Mellin | Feb. 19, 1895 |
| 838,466 | Semple | Dec. 11, 1906 |
| 959,618 | Schmidt | May 31, 1910 |
| 974,925 | Schulte | Nov. 8, 1910 |
| 1,989,341 | Shenton | Jan. 29, 1935 |
| 2,285,323 | Beekley | June 2, 1942 |
| 2,379,181 | Pontius | June 26, 1945 |
| 2,479,359 | Holt | Aug. 16, 1949 |
| 2,575,272 | Harris | Nov. 13, 1951 |
| 2,676,612 | Stevenson | Apr. 27, 1954 |
| 2,694,544 | Hall | Nov. 16, 1954 |
| 2,701,119 | Smith | Feb. 1, 1955 |
| 2,795,391 | Krone | June 11, 1957 |